US006571333B1

(12) United States Patent
Jain et al.

(10) Patent No.: US 6,571,333 B1
(45) Date of Patent: May 27, 2003

(54) INITIALIZING A MEMORY CONTROLLER BY EXECUTING SOFTWARE IN SECOND MEMORY TO WAKEUP A SYSTEM

(75) Inventors: Satchit Jain, San Jose, CA (US); Sung-Soo Cho, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/434,973

(22) Filed: Nov. 5, 1999

(51) Int. Cl.[7] .................................. G06F 9/445

(52) U.S. Cl. ........................ 713/2; 713/1; 713/100

(58) Field of Search .................. 320/112; 342/357.12; 345/417, 427; 358/1.13; 365/230; 379/38; 710/1, 14, 124, 261; 713/2, 200, 310, 320, 323, 324, 330; 714/2

(56) References Cited

U.S. PATENT DOCUMENTS 4,924,169 A * 5/1990 Shifflet et al. ............ 320/21
5,499,384 A * 3/1996 Lentz et al. ............... 710/1
5,608,884 A * 3/1997 Potter ..................... 710/124
5,657,445 A * 8/1997 Pearce ..................... 710/37
5,764,999 A * 6/1998 Wilcox et al. ............ 710/260
5,919,264 A * 7/1999 Reneris .................... 713/320
5,931,951 A 8/1999 Ando
5,958,058 A * 9/1999 Barrus ..................... 713/310
5,983,353 A * 11/1999 McHann, Jr. ............ 713/310
6,078,290 A * 6/2000 McBurney et al. .... 342/357.01
6,122,748 A * 9/2000 Hobson .................... 710/104
6,128,747 A * 10/2000 Thoulon .................. 713/300
6,378,056 B2 * 4/2002 Nizar et al. ............... 711/170
6,384,777 B1 * 5/2002 McBurney et al. .... 342/357.12
6,393,573 B1 * 5/2002 Gillespie et al. .......... 108/54.1

FOREIGN PATENT DOCUMENTS

WO WO99/19874 4/1999

* cited by examiner

*Primary Examiner*—Thomas Lee
*Assistant Examiner*—Thong-Thai Tien Nguyen
(74) *Attorney, Agent, or Firm*—Fish & Richardson P.C.

(57) ABSTRACT

A system has a processor with multiple states, including an awake state and a sleep state, a memory subsystem including a memory controller and memory devices, and a second memory. The system uses software in the second memory to initialize the memory controller upon a transition from a sleep state to an awake state. The system detects a wake event trigger, and in response to the wake event trigger, executes software stored in the second memory to initialize the memory controller, and then executes software out of the first memory after the initialization.

30 Claims, 6 Drawing Sheets

POWER DOWN SIGNAL
Memory Clock
40
OPERATING SYSTEM
80
30
Main Memory (RDRAM)
POWER DOWN SIGNAL
Memory Controller
20
POWER DOWN SIGNAL
CACHE
100
PAM REGISTER
90
10
Processor
WAKE TRIGGER STATE MACHINE
110
INITIALIZATION SOFTWARE
70
60
Nonvolatile Memory (SMM, BIOS) (RAM or ROM)
POWER DOWN SIGNAL
Processor Clock
50
RESET

INITIALIZING A MEMORY CONTROLLER BY EXECUTING SOFTWARE IN SECOND MEMORY TO WAKEUP A SYSTEM

FIELD OF THE INVENTION

This invention relates to sleep state transitioning.

BACKGROUND

To implement low power "sleep" states in processor systems, INTEL™ and others have proposed the Advanced Configuration and Power Interface Specification ("ACPI"). ACPI defines an interface between the operating system and hardware that allows operating systems and hardware to interact, while permitting the design of operating systems and hardware to evolve independently. The description of the S1 and S2 sleep states found in the ACPI Specification, Revision 1.0b, released Feb. 2, 1999 is reproduced in an Appendix to this specification.

RAM subsystems can also have low power states. In some RAM subsystems, a memory controller communicates with the memory chips using a particular protocol. The memory controller is an intelligent device that is initialized before it begins the normal operation of reading data from and writing data to the memory chips. In the RDRAM™ RAM subsystem, developed by RAMBUS™, Inc. of Mountainview Calif. the memory controller includes a RAMBUS ASIC Cell ("RAC") that controls the electrical interface to the memory chips, performs multiplexing and demultiplexing functions, and converts data between a high speed proprietary serialized interface to the memory chips and the lower speed parallel interface used by the processor. The RDRAM subsystem can be powered down to conserve power. The RDRAM subsystem must be reinitialized after being powered down.

SUMMARY OF THE INVENTION

A system has a processor with multiple states, including an awake state and a sleep state, a memory subsystem including a memory controller and memory devices, and a second memory. The system uses software in the second memory to initialize the memory controller upon a transition from a sleep state to an awake state. The system detects a wake event trigger, and in response to the wake event trigger, executes software stored in the second memory to initialize the memory controller, and then executes software out of the first memory after the initialization.

In another aspect of the invention, the memory subsystem is RAM based and stores some or all of the operating system software. The software that initializes the memory controller is stored in the BIOS storage device. Prior to transitioning from an awake state to a sleep state, the operating system controls the preparation for the transition

DETAILED DESCRIPTION

Figure 1:
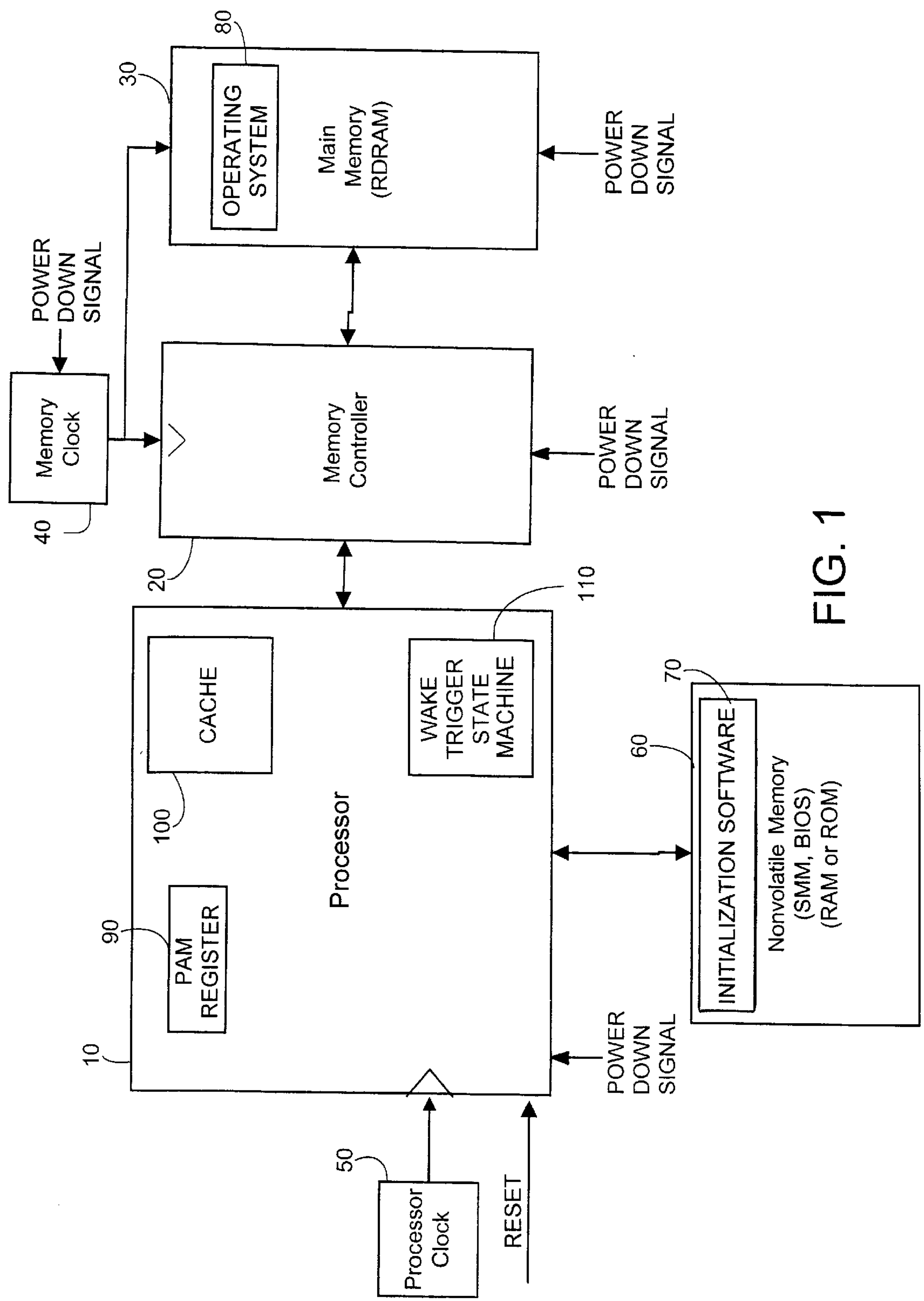
FIG. 1 is a block diagram of a processor system incorporating the invention.

As shown in FIG. 1, a processor 10 is connected to a memory controller hub 20. The processor may be a Pentium II® class processor, other general purpose processor, or dedicated controller. The processor may be part of a work station, desktop personal computer, portable computer, or telecommunications, video, or graphics device. Memory controller hub 20 is connected to, and controls, main memory 30. Memory controller hub 20 also handles graphics traffic and traffic to and from the I/O controller hub. Main memory 30 can be, for example, a RAMBUS memory system including multiple memory modules, each holding RDRAM memory chips. The individual modules can be of a comparable size to standard dual inline memory modules.

The memory controller hub 20 interacts with main memory 30 using a packetized protocol. The memory controller acts as an interpreter between the RAM bus and processor 10 so that the processor does not need to concern itself with the details of the RAM structure or operation. Other high speed RAM technologies using a memory controller to access main memory may be used as well.

Memory controller hub 20 and main memory 30 are clocked by memory clock 40. For example, main memory may be differentially clocked at 400 MHZ using dual phase clocking to provide an effective clock rate of 800 MHZ. The processor is clocked by processor clock 50. Also coupled to processor 10 via I/O controller hub 55 is nonvolatile memory 60. The nonvolatile memory 60 may be ROM, EPROM, EEPROM, battery-backed RAM, and the like. The nonvolatile memory 60 stores the BIOS (basic input/output software) and may include SMM (system management mode software). The SMM may also reside in the main memory.

The nonvolatile memory 60 stores the initialization software 70 used to initialize memory controller hub 20. Initialization software 70 may be part of the BIOS or part of the SMM software, if present. In some applications, the initialization software may be independent of the BIOS, for example, in systems that do not have BIOS software external to processor 10. Memory controller hub 20 includes internal registers 90 that control the address space mapping ("PAM registers"). These registers control whether the address generator looks to nonvolatile memory 60 for instructions and data or looks to main memory 30. Alternately, the PAM registers may reside in I/O controller hub 55 or in a separate well in the processor such that power is not lost when processor 10 is powered down. Connected to processor 10 is display or graphics controller 95.

Processor 10 may include cache 110 to speed up memory access time. The cache may be internal to the processor chip or package and may also be external. I/O controller 55 contains a wake trigger state machine 100 to process wake event triggers received from outside the processor. State machine 100 can also reside in memory controller hub 20 or processor 10. This state machine enables the processor to respond to wake events at a time before any software begins to execute.

Once the system is running, the system is in an awake state, memory controller hub 20 is initialized, portions of operating system 80 are loaded into main memory 30, and the system is in normal operation.

Figure 2:
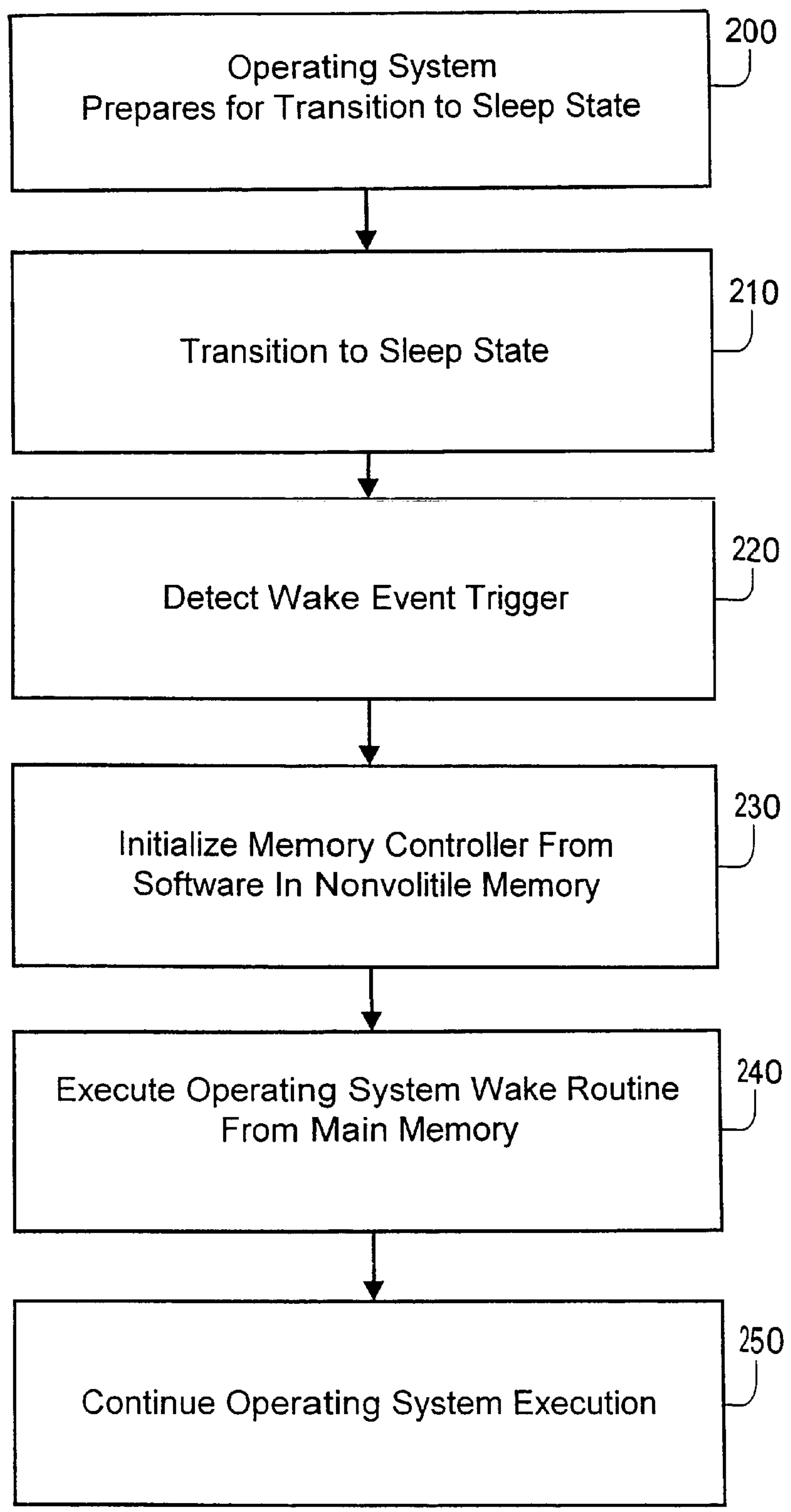
FIG. 2 is a flow chart depicting a set of state transitions performed by the system of FIG. 1.

Referring to FIG. 2, the operating system may determine that power should be conserved and that the system should enter a sleep state. This determination may be triggered based on an innumerable host of factors, such as a system idle time out, a request from a user, a request from a hardware device, such as a low battery or high temperature indication, or a request from an applications program.

Before entering a sleep state, in step 200 the operating system prepares for the transition. This preparation may include housekeeping tasks, cache flushing, context saving, and the like. The operating system may also determine which devices are to be placed in a "sleep" state. In circumstances where a system is designed to maximize power savings, the entire system may be placed in a sleep state. In more simple designs, only the processor and the memory subsystem may be placed in a sleep state, while peripherals are left either fully powered or turned off. The operating system also selects the desired sleep state and sets the appropriate bit or bits in a sleep state register. For example, the ACPI specification includes the S1 and S2 sleep states that provide for a low latency return to the awake state.

In step 210, the processor transitions to the sleep state. One way to accomplish this transition is to set the appropriate bits in a sleep enable register. Either a software or hardware process then detects that this bit is set and asserts a sleep signal to the appropriate components. Processor clock 50 is powered down. Powering down may be accomplished by disconnecting power from the device itself, or may be accomplished by electrically disconnecting the incoming signal from the internal distribution lines internal to each chip. For example, processor clock 50 may be left running, but the processor may electrically disconnect the incoming clock signal so the processor's internal components are not being clocked. Likewise, individual devices may be powered down with circuitry internal to the devices that prevent the flow of power to some or all of the components inside the device. In an RDRAM system, memory controller hub 20, main memory 30, and memory clock 40 are powered down. When the main memory is power down, its contents are not lost, but the main memory devices transition to a power down state that consumes very little power. An internal self refresh mechanism within main memory 20 keeps the memory contents when main memory is powered down. Also, memory clock 40 transitions to a low power state. In the low power state, physical power may or may not be removed.

In step 220, a wake event trigger is detected. This trigger signals that processor 10 should resume normal operation. In some applications, this may be a return to full speed, full power mode. In other applications, the system may awaken to a more drowsy state where processor 10 may not be running at full speed. The wake event trigger may be generated by a source outside the system itself, such as a user pressing a "power on" or "resume" key, an incoming call signal from a modem or other telephony receiver, or it may be generated by a timer tied to a particular time of day or some other event such as scheduled system maintenance.

In response to the detected wake event trigger, the system initializes the memory controller in step 230. In an RDRAM system this includes initializing the RAC and the RDRAM core. Other functions performed during initialization may be recalibration of the RAM bus drivers, synchronization of the RAM bus clock, and a general reset of the memory controller. This initialization is not performed exclusively by the hardware, but rather involves executing initialization software 70 from nonvolatile memory 60.

After memory controller hub 20 is initialized, control is passed in step 240 from the initialization software 70 to operating system 80 stored in main memory 30. Operating system 80 now processes the wake event trigger. This processing can include restoring the processor context, performing a quick system diagnostic, or other routine typically executed following a wake event.

Figure 3:
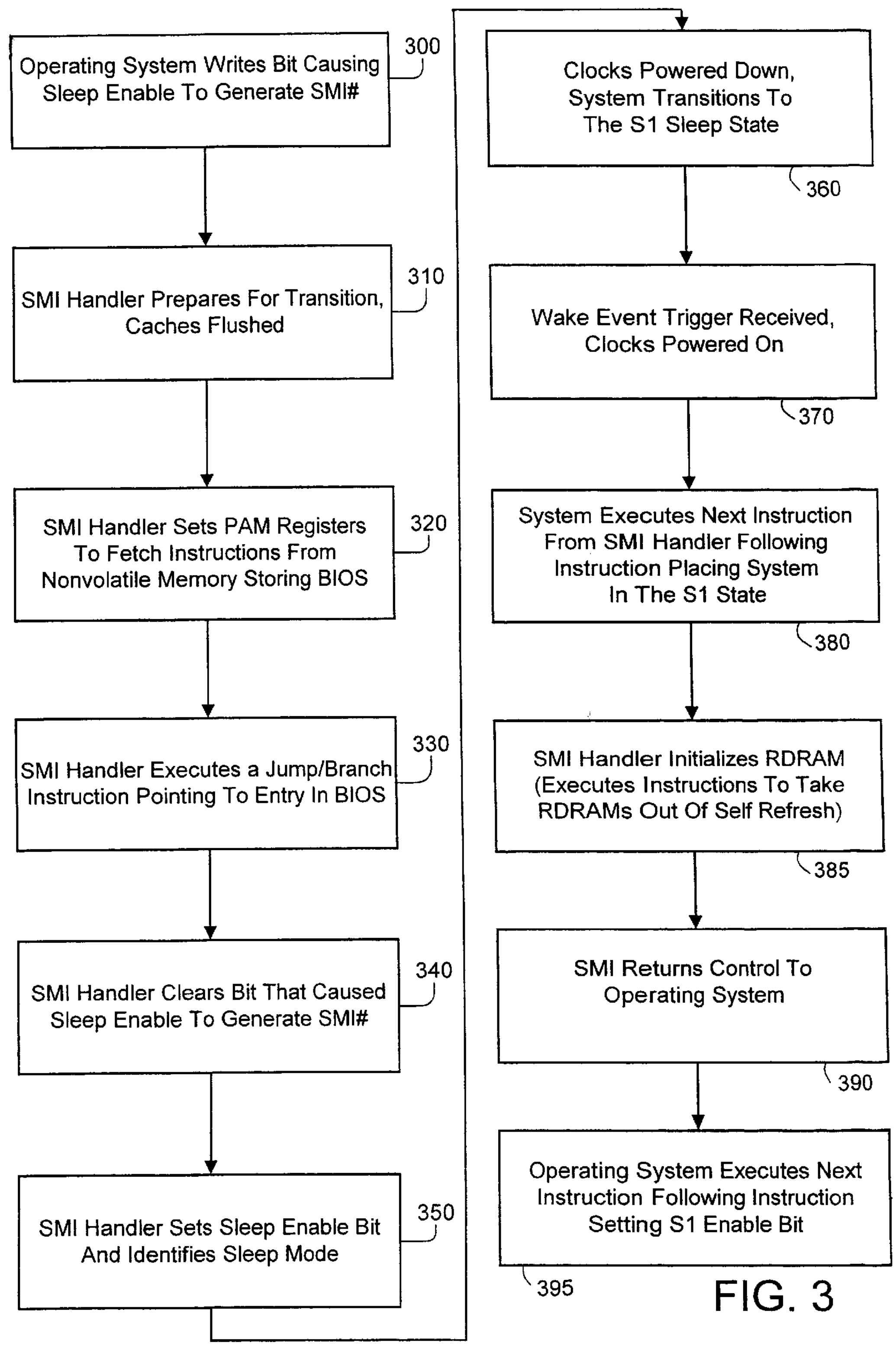
FIG. 3 is a flow chart depicting a transition to and from the S1 state performed by the system of FIG. 1.

FIG. 3 shows an embodiment implementing the S1 sleep state with RDRAM. In normal operation, setting the sleep enable bit will cause the processor to transition to the S1 sleep state. In this embodiment, however, the system management mode software is used to mediate between the sleep state and the RDRAM. A portion of the system management mode software is stored in nonvolatile memory 60 that also stores the BIOS (the BIOS storage device). The system management mode software, however, is inaccessible to the operating system. The operating system has no means by which it can directly jump to routines within the system management mode software.

To allow for control to efficiently and cleanly shift from the operating system to the system management mode software, the processor is configured to respond to a sleep trigger with a system management interrupt (SMI). To accomplish this, the operating system writes a bit to a register in step 300. This register tells the hardware to generate an SMI in response to a sleep enable signal, rather than responding with a transition to a sleep state. In response to the SMI, the processor directs control to the system management mode software. In step 310, the SMI Handler, which services the SMI, flushes the cache. This cache flush avoids unified write backs in the L2 cache on instruction fetches. If this step is performed, there will be no further memory writes until the processor transition from the sleep state. Next, as shown in step 320, the SMI Handler sets the PAM registers to point to the BIOS storage device. The PAM holds the address space mapping for the system. Once the PAM registers are pointing to the BIOS storage device, instructions and data will be fetched from that device and not from the RDRAM. In step 330, the SMI Handler executes a jump/branch instruction that points to an entry in the BIOS storage device.

In step 340, the SMI Handler clears the bit that causes the processor to generate an SMI in response to a sleep enable. The processor is now reconfigured to enter a sleep state in response to a sleep enable signal. In step 350, the sleep enable bit is set for a second time. This time, however, it is the SMI Handler that sets the bit, not the operating system. The SMI Handler also identifies the desired sleep mode. In this embodiment the desired sleep mode is the S1 state. The processor detects that the sleep enable bit is set and, in step 360, the system transitions to the S1 sleep state. The processor clock and RDRAM clock are powered down. In this embodiment, the processor and RDRAM subsystem each have their own respective clocks. In other embodiments the processor and memory subsystem can use the same clock as their respective clocks. Once the RDRAM subsystem is powered down, it requires reinitialization.

In step 370, a wake event trigger is received by the hardware signaling that the system should return to the awake state from the sleep state. The clocks are returned to their power on state. The processor resumes instruction fetching. In step 380, the first instruction to be fetched is the instruction from the SMI Handler following the transition to the S1 state. In step 385, the SMI Handler then executes the instructions to initialize the RDRAM. In step 390, the SMI Handler then sets the PAM registers to point to an entry in the RDRAM. The SMI Handler then executes the return instruction and control transfers to the operating system. In step 395, the operating system executes the next instruction following the instruction in which it set the sleep enable bit. The system has returned successfully from the sleep state and normal operation continues.

Figure 4:
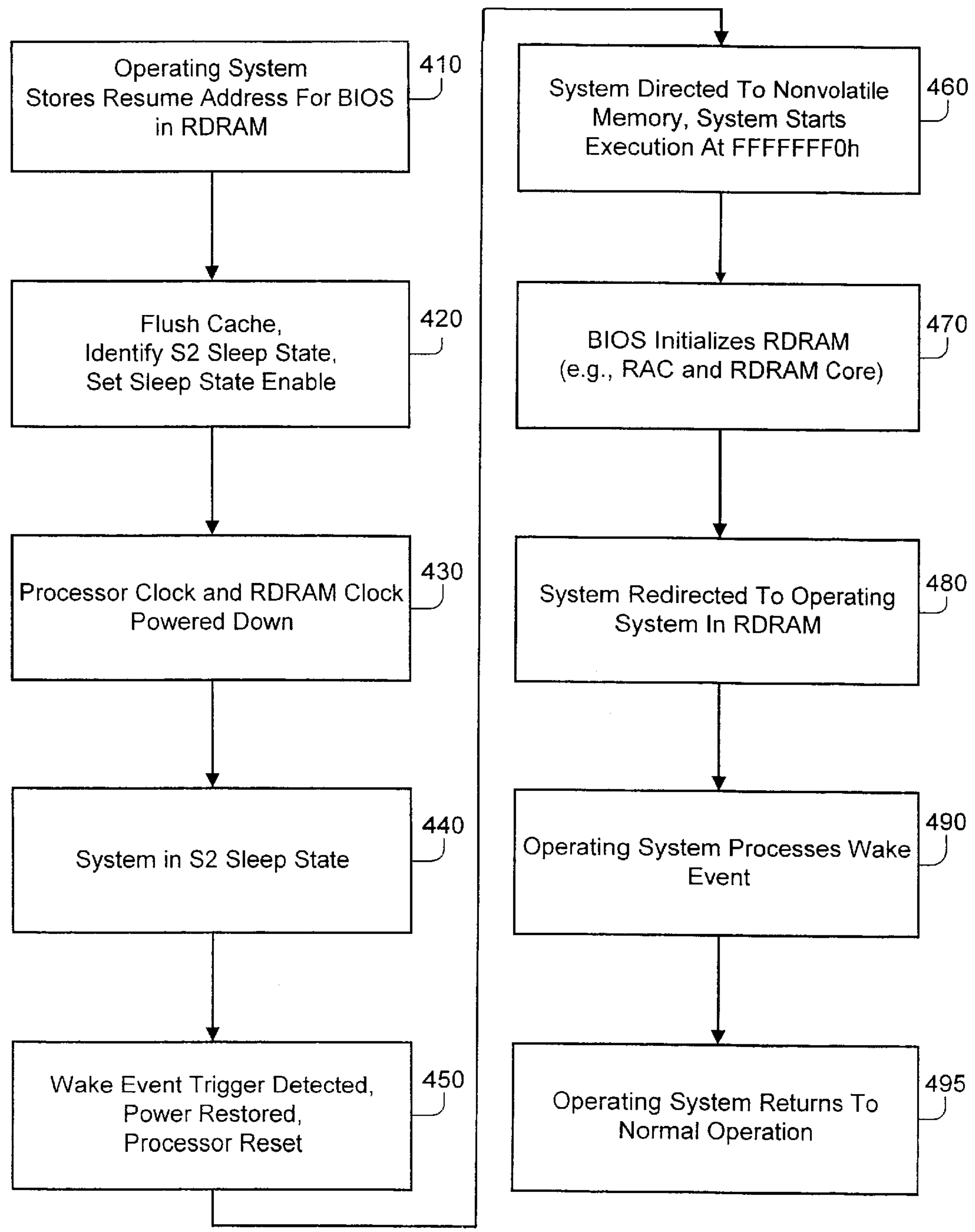
FIG. 4 is a flow chart depicting a transition to and from the S2 state performed by the system of FIG. 1.

FIG. 4 shows an embodiment using the S2 state. The operating system desires to enter the sleep state in step 410 and stores the resume address used by the BIOS in the RDRAM. The operating system flushes the cache in Step 420, identifies the sleep state by writing the S2 state into the sleep type register, and enables the sleep state by writing the appropriate information into the sleep enable register. The processor and RDRAM clocks are powered down in step 430. In the S2 state, the power to processor 10 is actually removed so that processor 10 is not consuming either active or leakage power.

The system is in the S2 state in step 440. A wake event trigger is detected in step 450. Power is restored to the clocks. A processor reset (CPURST#) is also asserted resetting the processor. The system comes out of reset in step 460 and starts executing software at location FFFFFFF0h. The PAM registers are configured to point to the BIOS storage device and not to shadow this space in the RDRAM. Alternatively, a hardware state machine can respond to the wake event by changing the PAM registers to point to the BIOS storage device. In step 470, the BIOS initializes the RDRAM. In step 480, the BIOS redirects the PAM registers to execute software from the RDRAM. BIOS passes control to the operating system via the resume address stored in RDRAM in step 410. In step 490, the operating system processes the wake event interrupt. In step 495, recovery from the sleep state is complete and normal operation in the awake state resumes.

Figure 5:
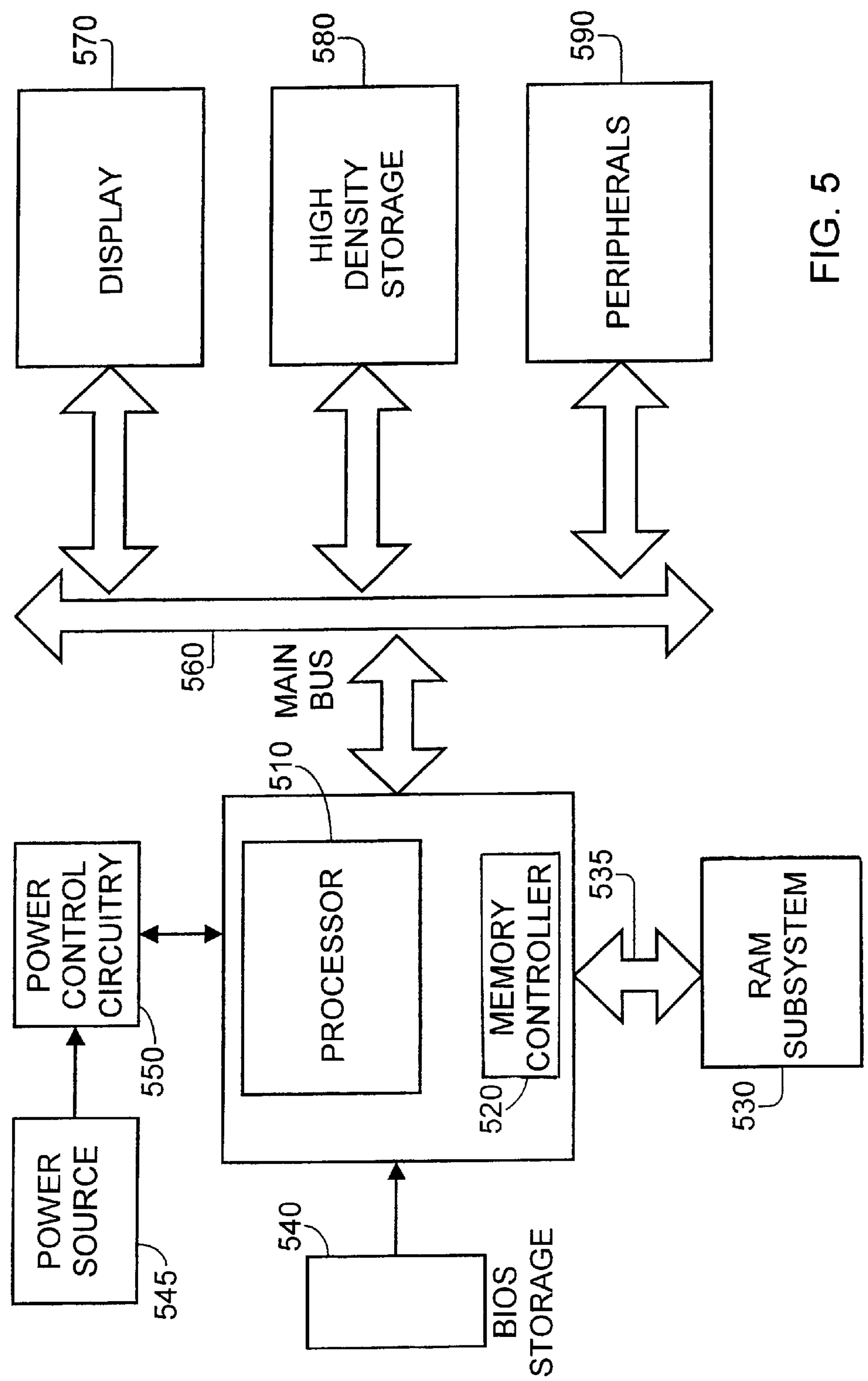
FIG. 5 is a block diagram illustrating another processor system.

FIG. 5 shows a processor and memory subsystem within the context of a larger system, such as might be found in a desktop system, portable computer, portable communications device, set top box, or video and graphics controller. Processor 510 and memory controller 520 are incorporated within the same chip. The processor interacts with the memory 530, preferably RDRAM, via memory controller 520 through memory bus 535. Memory controller 520 wakes and is initialized by the execution of software from BIOS storage device 540. It may be desirable in some applications to incorporate the BIOS storage device into the same chip as processor 510 and memory controller 520.

Power to the system is supplied by power source 545. In a portable system, power source 545 may be a battery. In desk top or set top devices, the power source may be a DC source drawing AC line power. The power is distributed by power control circuitry 550. Power control circuitry is responsive to the processor to decrease or cut off power to various parts of the system. Power control circuitry 550 can also inform processor 510 of a low power condition. As shown the power control circuitry interfaces with the processor in a manner independent of main bus 560. In other embodiments, the power control circuitry may be treated as any other peripheral connected to the main bus. In a desk top system, the main bus may be a PCI bus. Connected to the main bus are display 580, high density storage 590, and peripherals 590. In some systems that are graphics intensive, display or graphics controller 580 may have its own dedicated or high speed path to the processor. Display or graphics controller 580 may be connected to processor 10 or memory controller hub 20 through a separate bus or may be integrated with the memory controller in the processor core. High density storage 590 will typically be a hard drive. Peripherals 590 will vary with the particular application.

Figure 6:
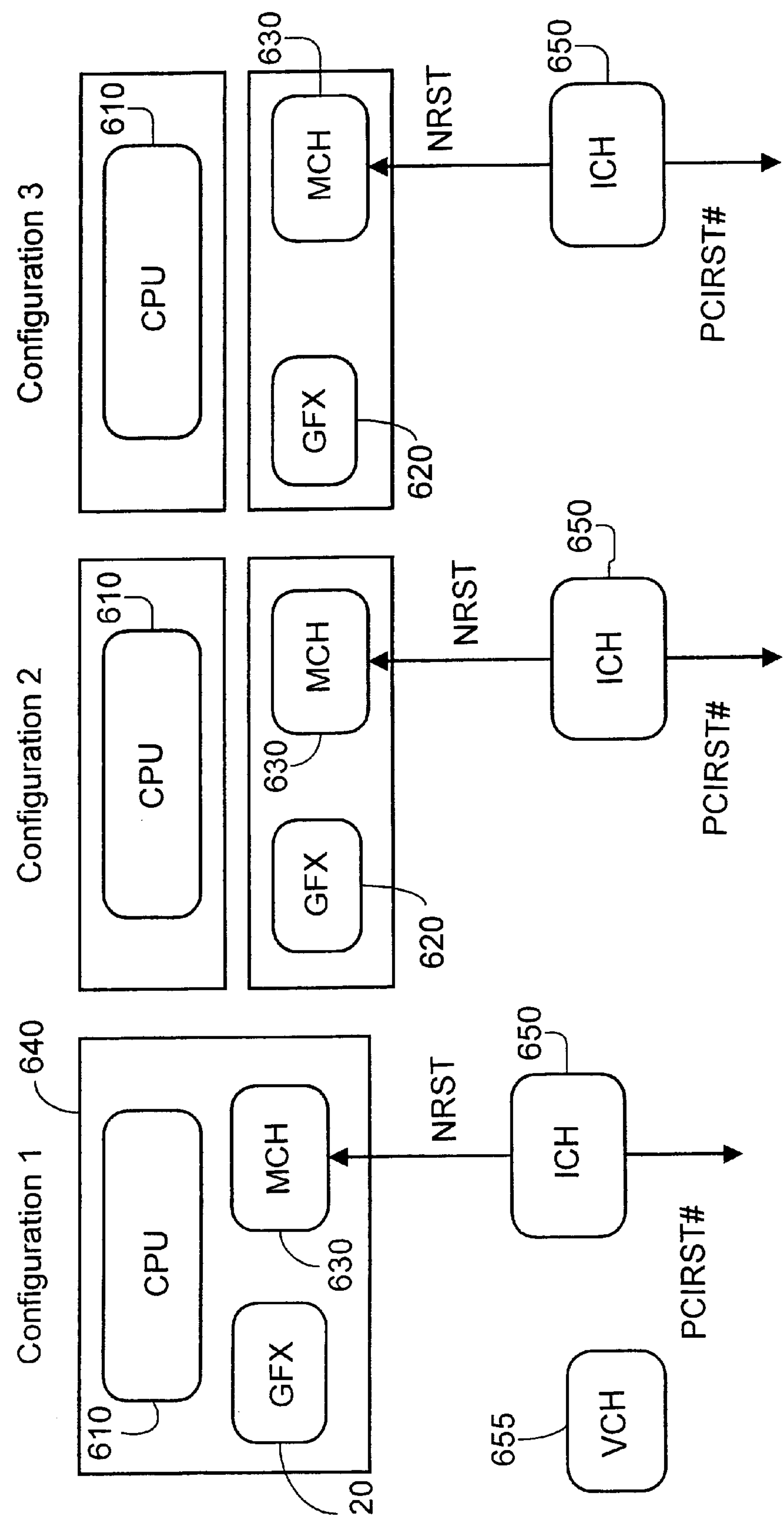
FIG. 6 illustrates another processor system.

Referring to FIG. 6, three different configurations for a core chipset are shown. Configuration 1 has the processor 610 (CPU), graphics controller 620 (GFX), and memory controller 630 (also called a memory controller hub or MCH) integrated into a single chip 640. The I/O controller hub 650 (ICH) and video controller hub 655 (VCH) are shown as distinct chips. The VCH may also be incorporated into chip 640. ICH 650 controls the operation of the main bus, for example, the main bus 560 shown in FIG. 5. ICH 650 has an output (NRST) that resets chip 640. ICH 650 has a separate output (PCIRST#) that resets the main bus, for example, a PCI bus. In configuration 2, processor 610, GFX 620, and MCH 630 are each in separate chips. In configuration 3, processor 610 is in its own chip. GFX 620 and MCH 630 are in a single chip. In configurations 2 and 3, CPU 610 has its own reset input under control of ICH 650.

In configuration 1 chip 640 and all its components are powered down in the sleep state, for example, an S2 state. In configuration 2, CPU 610 and MCH 630 are powered down. GFX 620 is left powered to maintain a display. Alternatively, GFX 620 may be powered down to conserve even more power. In configuration 3, CPU 610, GFX 620, and MCH 630 are powered down. Powering down the components in addition to stopping the clocks substantially reduces leakage currents. Additionally, the interface between ICH 650 and the other components is isolated. This interface is not a PCI interface, but a messaging protocol based interface. In each configuration, the ICH is left powered. The ICH has hardware necessary to recover from the sleep state. Reducing or eliminating leakage power in the S2 state from CPU 610, GFX 620, and MCH 630 will extend battery life in a substantial way in 0.18 micron process technologies and beyond.

The disclosed embodiments are exemplary only. Other embodiments are within the scope of the following claims.

Appendix

The S1 and S2 sleep states of the ACPI Specification, Revision 1.0b, released Feb. 2, 1999:

9.1.1 S1 Sleeping State

The S1 state is defined as a low wakeup latency sleeping state. In this state no system context is lost (CPU or chip set), and the hardware is responsible for maintaining all system context, which includes the context of the CPU, caches, memory, and all chipset I/O. Examples of S1 sleeping state implementation alternatives follow.

9.1.1.1 S1 Sleeping State Implementation (Example 1)

This example references an IA processor that supports the stop grant state through the assertion of the STPCLK# signal. When SLP_TYPx is programmed to the S1 value (the OEM chooses a value, which is then placed in the _S1 object) and the SLP_ENx bit is subsequently set, the hardware can implement an S1 state by asserting the STPCLK# signal to the processor, causing it to enter the stop grant state. In this case, the system clocks (PCI and CPU) are still running. Any enabled wakeup event should cause the hardware to de-assert the STPCLK# signal to the processor.

9.1.1.2 S1 Sleeping State Implementation (Example 2)

When SLP_TYPx is programmed to the S1 value and the SLP_ENx bit is subsequently set, the hardware will implement an SI state by doing the following:

1. Place the processor into the stop grant state.
2. Stop the processor's input clock, placing the processor into the stop clock state.
3. Places system memory into a self-refresh or suspend-refresh state. Refresh is maintained by the memory itself or through some other reference clock that is not stopped during the sleeping state.
4. Stop all system clocks (asserts the standby signal to the system PLL chip). Normally the RTC will continue running.

In this case, all clocks in the system have been stopped (except for the RTC's clock). Hardware must reverse the process (restarting system clocks) upon any enabled wakeup event.

9.1.2 S2 Sleeping State

The S2 state is defined as a low wakeup latency sleep state. This state is similar to the S1 sleeping state, except that the CPU and system cache context is lost (the OS is responsible for maintaining the caches and CPU context). Additionally, control starts from the processor's reset vector after the wakeup event. Before setting the SLP_EN bit, the ACPI driver will flush the system caches. If the platform supports the WBINVD instruction (as indicated by the WBINVD and WBINVD_FLUSH flags in the FACP table), the OS will execute the WBINVD instruction. If the platform does not support the WBINVD instruction to flush the caches, then the ACPI driver will attempt to manually flush the caches using the FLUSH_SIZE and FLUSH_STRIDE fields in the FACP table. The hardware is responsible for maintaining chipset and memory context. An example of a S2 sleeping state implementation follows.

9.1.2.1 S2 Sleeping State Implementation Example

When SLP-TYPx is programmed to the S2 value (found in the _S2 object) and then the SLP_EN bit is set, the hardware will implement an S2 state by doing the following:

Stop system clocks (the only running clock is the RTC).

Place system memory into a self or suspend refresh state.

Power off the CPU and cache subsystem.

In this case, the CPU is reset upon detection of the wakeup event; however, core logic and memory maintain their context. Execution control starts from the CPU's boot vector. The BIOS is required to:

Program the initial boot configuration of the CPU (such as the CPU's MSR and MTRR registers).

Initialize the cache controller to its initial boot size and configuration.

Enable the memory controller to accept memory accesses.

Call the waking vector.

What is claimed is:

1. In a system comprising a processor, a first memory, a first memory controller, and a second memory, a method for transitioning between an awake state and a sleep state comprising:

detecting a trigger to transition from the sleep state to the awake state;

initializing the first memory controller in response to the detecting, the initializing comprising executing software in the second memory; and executing software in the first memory after the initializing.

2. The method of claim 1 further comprising:

preparing, under control of software stored in the first memory, for a transition from the awake state to the sleep state; and transitioning to the sleep state.

3. The method of claim 2 wherein the software stored in the first memory comprises operating system software.

4. The method of claim 2 wherein the first memory comprises RDRAM.

5. The method of claim 4 wherein the first memory controller resides in the same chip as the processor.

6. The method of claim 5 wherein the software in the second memory comprises BIOS software.

7. The method of claim 5 wherein the software in the second memory comprises software inaccessible by the operating system.

8. The method of claim 5 wherein the software in the second memory comprises system management mode software.

9. The method of claim 1 wherein the processor and memory controller have inputs for receiving respective clock signals, the method further comprising preventing the receiving of the respective clock signals prior to the detecting.

10. The method of claim 2 wherein the preparing comprises:

configuring the processor to execute the software stored in the second memory in response to a sleep trigger signal from the operating system;

receiving a first sleep trigger signal from the operating system;

executing the software stored in the second memory in response to the receiving;

reconfiguring the processor to transition to the sleep state in response to a sleep trigger signal; and receiving a second sleep trigger signal.

11. The method of claim 10 wherein the software stored in the second memory comprises system management mode software, the method further comprising generating a system management interrupt in response to the receiving of the first sleep trigger.

12. The method of claim 10 wherein the initializing executes the software stored in the second memory at the instruction following the last instruction executed before transitioning to the sleep state.

13. The method of claim 2 wherein the transitioning transitions the processor into an S1 state.

14. The method of claim 2 wherein the transitioning transitions the processor into an S2 state.

15. The method of claim 2 wherein the preparing comprises flushing a cache.

16. The method of claim 2 further comprising resetting the processor prior to the initializing.

17. In a system comprising a processor, a first memory, a first memory controller, and a second memory, wherein the processor and memory controller have inputs for receiving respective clock signals, and the first memory stores operating system software, a method for transitioning between an awake state and a sleep state comprising:

preparing, under control of the operating system software, for a transition from the awake state to the sleep state, the preparing including configuring the address space mapping to point to the second memory following the detecting;

preventing the receiving of the respective clock signals;

transitioning to the sleep state;

detecting a trigger to transition from the sleep state to the awake state;

initializing the first memory controller in response to the detecting, the initializing comprising executing BIOS software in the second memory;

executing operating system software after the initializing.

18. The method of claim 17 further comprising:

storing a BIOS resume address in the first memory; and transferring control from the BIOS to the operating system following the initializing using the resume address stored in the first memory.

19. The method of claim 18 further comprising powering down the first memory controller prior to the detecting.

20. A system comprising:

a processor having an awake state and a sleep state;

a first memory;

a first memory controller;

a second memory; and software stored in the second memory that executes to initialize the first memory controller responsive to a trigger signal signaling a transition from the sleep state to the awake state.

21. The system of claim 20 wherein:

the first memory stores operating system software;

the second memory is nonvolatile memory;

the second memory stores BIOS software; and the operating system software is configured to control a transition from the awake state to the sleep state.

22. The system of claim 21 wherein:

the operating system stores a BIOS resume address in the first memory prior to a transition from the awake state to the sleep state; and the BIOS software returns control to the operating system using the stored BIOS resume address after the memory controller is initialized.

23. The system of claim 21 wherein the first memory comprises RDRAM.

24. The system of claim 21 wherein the second memory comprises RAM.

25. The system of claim 21 further comprising system management mode software, the system management mode software being inaccessible by the operating system, and wherein the system management mode software initializes the first memory.

26. The system of claim 20 wherein the processor, first memory, and first memory controller have clock inputs, the system comprising clock disable circuitry preventing the internal clocking of the processor, first memory, and first memory controller.

27. The system of claim 20 wherein the processor and first memory controller reside within a common chip.

28. The system of claim 20 further comprising cache residing in the same chip as the processor and first memory controller and wherein the operating system is configured to flush the cache prior to the transition from the awake state to the sleep state.

29. A portable computer system comprising:

a power storage medium;

a display;

a processor;

a processor clock;

a first memory;

a first memory controller;

a second memory;

wherein the system includes an awake state and a sleep state;

wherein the processor and first memory controller are not clocked in the sleep state; and wherein software in the second memory initializes the first memory controller responsive to a transition from the sleep state to the awake state.

30. The system of claim 29 further comprising circuitry to disable the flow of power internal to the processor, first memory controller, and first memory.

* * * * *